United States Patent
Hohenstein

[15] 3,683,300
[45] Aug. 8, 1972

[54] LASER CAPILLARY SUPPORT SPACER

[72] Inventor: Jack H. Hohenstein, 1234 Laurel Lane, Lafayette, Calif. 94549

[22] Filed: Aug. 19, 1970

[21] Appl. No.: 65,018

[52] U.S. Cl. ................................331/94.5, 313/204
[51] Int. Cl. ............................H01s 3/02, H01s 1/06
[58] Field of Search ......................331/94.5; 313/204

[56] References Cited

UNITED STATES PATENTS

| 2,332,189 | 10/1943 | Arnold et al. | 313/204 |
| 3,528,028 | 9/1970 | Baird | 331/94.5 |
| 3,566,302 | 2/1971 | Rhodes | 331/94.5 |

FOREIGN PATENTS OR APPLICATIONS

| 6,707,770 | 12/1967 | Netherlands | 331/94.5 |

Primary Examiner—William L. Sikes
Assistant Examiner—R. J. Webster
Attorney—Fitch, Even, Tabin and Luedeka

[57] ABSTRACT

A laser is described in which a diaphragm of flexible electrically non-conductive material is used to at least partially support an elongated capillary within a tubular glass envelope. The diaphragm separates the glass envelope into positive and negative discharge chambers and is in the shape of an annular channel member with inner and outer annular walls. Such walls engage the capillary and the inner surface of the envelope, respectively, along a length sufficient to prevent discharge between the positive and negative discharge chambers.

9 Claims, 6 Drawing Figures

PATENTED AUG 8 1972 3,683,300
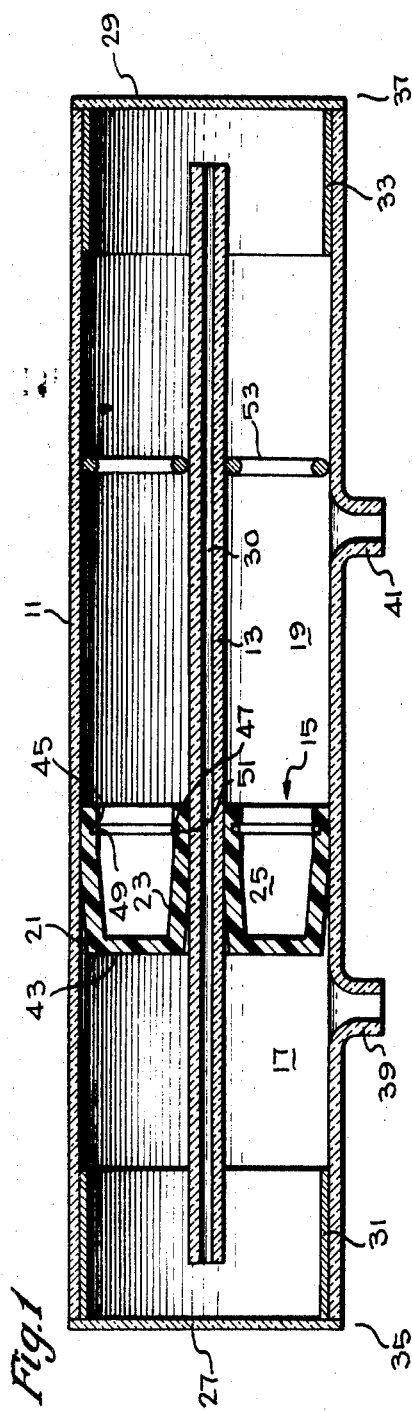
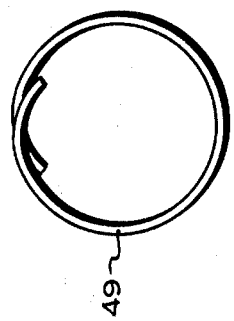
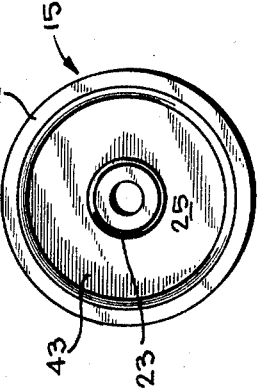
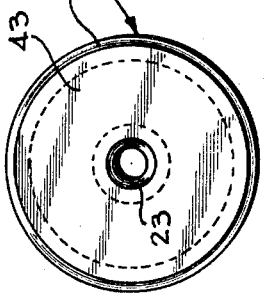
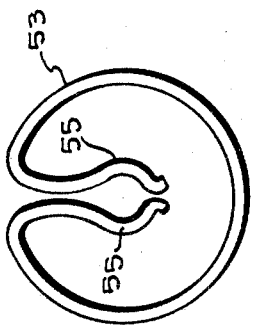
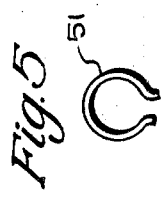
Inventor
Jack H. Hohenstein
Anderson, Luedeka, Fitch, Even & Tabin
Attys.

LASER CAPILLARY SUPPORT SPACER

This invention relates generally to lasers and, more particularly, to an improved laser of economical construction.

The laser is acquiring greater importance as a useful tool in a variety of applications. Lasers are used in many forms for instrumentation, communication, and even for various types of surgery. Laser light is useful in such applications because it is monochromatic, coherent (all radiation is in phase), highly dense, and high in frequency.

The helium-neon coaxial gas laser is a particularly useful type of laser because of its relative simplicity and because of the convenient wavelength (6,328 Angstrom units) in the visible red region of the spectrum. In a helium-neon gas laser, helium gas is excited by a d-c or RF discharge in a non-conducting container. One of the helium energy level transitions caused by the discharge excites the neon atoms to a particular energy level. One of the neon energy level decay transitions releases radiation at the 6328 Angstrom units wavelength.

In a helium-neon coaxial gas laser, in order to constrain the excited atoms and make them available for stimulation, a capillary is used. This capillary typically consists of a glass tube suspended coaxially inside the envelope of the laser. In order to concentrate the early radiation produced by the laser, which is typically randomly directed, and thus stimulate other excited atoms to produce a large quantity of visible light, mirrors are typically used at the ends of the glass envelope or outside the glass envelope. These mirrors reflect light energy back into the envelope to hit more excited neon atoms and thus contribute to a rapid multiplication of stimulated radiation. One of the reflective mirrors should be slightly less reflective than the other and, when the light bouncing back and forth between the two mirrors is sufficiently intense, a beam of light will pass through the weaker mirror. It is this beam of light, which is coherent, monochromatic, and of very high density and frequency, which is useful in the many applications of lasers.

A significant deterrent to the widespread use of lasers has been the relatively high cost of manufacturing such devices. The two factors which contribute most substantially to the cost of manufacturing a coaxial gas laser are the mirrors used to reflect the light and the glass blowing which is typically necessary in manufacturing the envelope and the capillary therein. In manufacturing a coaxial laser wherein the capillary is suspended inside the envelope, a series of operations are necessary that result in the internal suspension of the capillary while simultaneously separating or dividing the envelope into positive and negative discharge chambers. By separating the positive and negative discharge chambers, the high potential therebetween is forced to pass through the capillary. This action increases the density of excited atoms and therefore increases the laser's gain. Since glass is the only material that is practical for a laser of this type, partially because it can be formed and partially because it does not conduct electricity, the manufacture of a laser of this type has typically necessitated that the outer glass envelope be cut apart, joined to the capillary, and then reunited with its separated half. This operation does not lead itself to automation but rather has heretofore required relatively expensive hand glass blowing.

Accordingly, it is an object of the present invention to provide an improved laser.

Another object of the present invention is to provide a coaxial laser of the helium-neon type in which the amount of hand glass blowing that is required is substantially reduced.

Another object of the invention is to provide an improved laser which is capable of being assembled automatically or by a semi-skilled worker.

It is another object of the invention to provide a coaxial laser wherein the strength of the envelope is substantially increased and wherein the dimensions are more closely regulated than in prior art designs.

Other objects of the invention will become apparent to those skilled in the art from the following description taken in connection with the accompanying drawings wherein:

FIG. 1 is a full section view of a laser constructed in accordance with the invention;

FIG. 2 is an end view of a diaphragm used in the laser of FIG. 1 viewed from the left-hand side thereof as seen in FIG. 1;

FIG. 3 is a view of the diaphragm of FIG. 2 from the opposite side thereof; and

FIGS. 4, 5, and 6 are plan views of three types of springs which are utilized in the laser of FIG. 1.

Very generally, the laser of the invention comprises a tubular glass envelope 11. An elongated capillary 13 is disposed axially within the envelope. A diaphragm 15 of flexible electrically non-conductive material at least partially supports the capillary within the envelope. The diaphragm divides the interior of the envelope into positive and negative discharge chambers 17 and 19. The diaphragm comprises an annular channel member having an outer annular wall 21 and an inner annular wall 23 separated by at least one annular channel 25. The inner annular wall engages the capillary and the outer annular wall engages the inner surface of the envelope along a length in each case sufficient to prevent discharge between the chambers 17 and 19 except through the capillary.

Referring now more particularly to FIG. 1, the glass envelope 11 is in the form of an elongated tube and has its ends closed by a pair of mirrors 27 and 29. The mirrors are joined about their periphery to the ends of the glass tube by means of an epoxy or other suitable sealant. One of the mirrors 27 and 29 is capable of passing some light therethrough in order to allow the laser to emit the coherent monochromatic light produced therein. Alternatively, the ends of the tube may be closed by transparent glass discs and mirrors may be positioned externally of the envelope in axial alignment therewith for reflecting light back into the capillary 13. In such a case, the ends of the tube need not be cut square as shown, but rather may be cut to lie in a plane which is at an oblique angle with the axis of the tube rather than perpendicular thereto. The angle selected may be the so-called Brewster's angle, which enables enhancement of a particular wavelength for production by the laser.

The capillary 13 is supported, by means subsequently described, within the tubular envelope 11 in coaxial relation thereto. The capillary 13 has an axial capillary passage 30 therein in which the laser action takes place, as is known in the art. The passage 30 provides communication between the positive and negative discharge chambers 17 and 19, and enables a flow of electrons therebetween.

In order to produce a flow of electrons through the capillary 13, the envelope 11 contains a pair of electrodes 31 and 33 at the respective ends thereof. These may be bare wires, or they may be cylinders as shown. The bare wires should be tungsten or other material resistive to bombardment by ions. The cylinders are of a cold cathode design familiar to those knowledgeable in the art. The diameter of the cylinders and their length depends on the surface area desired, but the inner diameter of the cylinders should exceed the diameter of the passage 30 in the capillary 13. Electrical connection from outside of the envelope is made to the cylinder 31 by a thin strip of metallic foil or conductive paint 35 passed through the joint between the mirror 27 and the end of the tube. A similar thin foil or conductive paint strip 37 provides external connection to the metallic cylinder 33. The cylinders 31 and 33 serve as the anode and cathode of the laser by connection across a suitable source of potential, not shown. The particular configuration of anode and cathode shown provides a very efficient discharge and collection of electrons in the laser. The regions where the strips of foil or conductive paint 35 and 37 pass out of the envelope may be sealed with epoxy to ensure the integrity of the tube.

In order to evacuate the interior of the envelope 11 and to fill the respective chambers 17 and 19 with the appropriate gas, the envelope is provided with a pair of evacuation ports 39 and 41, positioned towards respective ends of the envelope. As will be explained subsequently in describing the assembly of the laser of the invention, the evacuation ports 39 and 41 are sealed by appropriate means, such as tipping off with a torch as is known in the art, once the respective chambers 17 and 19 are filled with the appropriate type of gas. A single evacuation port could be used, rather than the two shown, but the narrow passage 30 would make such a procedure inefficient.

In order to electrically separate the discharge chambers 17 and 19 to force the electrons through the passage 30 in the capillary 13, many prior art devices have utilized a glass wall formed integral with or sealed to the envelope and the capillary. As previously mentioned, this substantially increases the cost of manufacturing the laser. In accordance with the invention, the diaphragm 15 is utilized for this purpose.

Referring to FIGS. 2 and 3 in addition to FIG. 1, the particular configuration of the diaphragm 15 is of generally U-shaped cross section and defines an outer annular wall 21 and an inner annular wall 23 joined by a web 43 which constitutes the bottom of the U. Another way of describing the diaphragm is that it is in the form of an annular channel member which defines an annular open-sided channel 25 separated by the annular walls 21 and 23. The outer annular wall 21 is generally coaxial with the tubular envelope 11 and engages the inner surface thereof along a substantial axial distance. Similarly, the inner annular wall 23 is generally coaxial with the capillary 13 and extends a substantial distance along the outer surface thereof in engagement therewith.

Although the U-shaped cross section of the annular channel member comprising the diaphragm 15 is the preferred configuration, the invention is not limited thereto. Thus, the diaphragm may comprise an annular channel member of any convenient cross section, provided that the outer and inner walls can resiliently engage the envelope and capillary, respectively, (to facilitate assembly), and provided that the distance of engagement is sufficient to prevent discharge as described below. One example of an alternative form is an annular channel member having a cross section in the shape of the cross section of an I-beam. In such a case, both edges of the annular inner and outer walls would be capable of flexing. If the walls are made slightly convex with respect to the surfaces they engage, a region of contact can be provided.

A discharge path between the discharge chambers 17 and 19 which is of lower resistance than the path through the passage 30 in the capillary 13 will deleteriously affect the performance of the laser. For example, where the discharge voltage through the capillary is 5,000 volts, a voltage path outside of the capillary of, for example, 2,000 volts will result in a discharge directly between the two chambers and not through the capillary. Such a situation is prevented by the diaphragm of the invention by providing a substantial distance of contact between the diaphragm and the glass surfaces which it engages, thereby presenting a potential breakdown path between the chambers which is of higher resistance than the path through the capillary 13.

In order to provide this, the diaphragm is made of a flexible electrically non-conductive material. The material should have sufficient flexibility as to maintain the necessary contacting pressure against the glass surfaces as to prevent discharge therealong and, in addition, to provide at least partial support for the capillary 13. The outer diameter of the diaphragm increases toward the open side of the channel 25, and the inner diameter of the diaphragm decreases toward the open side of the channel 25. In some cases, the resilience of the material may be insufficient. To this end, in the illustrated embodiment, the channel side of the outer annular wall is provided with an annular groove 45 and the channel side of the inner wall is provided with an annular groove 47. A spring 49 is provided in the groove 45 to bias the outer wall outwardly against the inner surface of the envelope 11. Similarly, a spring 51 is provided in the groove 47 to bias the inner wall of the diaphragm inwardly against the outer surface of the capillary 13.

The spring 49 is illustrated in FIG. 4 and the spring 51 is illustrated in FIG. 5. The spring 49 is a loop with overlapped ends which can be compressed during assembly and which expands into the groove 45. The spring 51 is an unclosed loop which may be expanded by separating its ends for assembly, and which compresses itself into the groove 47.

The flexibility of the diaphragm 15 is also of advantage in order to compensate for the fact that glass tubes, as supplied by commercial manufacturers, are typically never exactly one dimension. For example, variations in diameter may exceed 0.05 inch in a glass tube of a nominal inside diameter of 0.810.

The material of which the diaphragm 15 is made is also of a material which has a very low outgassing rate under the conditions of laser operation. This is in order to prevent contamination of the tube as a result of partial vaporization of the diaphragm material. A material is preferred having an outgassing or desorption rate of less than about $5 \times 10^{-8}$ Torr liters per second per square centimeter after 48 hours under vacuum at room temperature. By vacuum, a pressure of less than 20 Torr is meant. A satisfactory flexible insulating material for this purpose is polytetrafluorethylene, sold under the trademark TEFLON. Another satisfactory material is that sold under the trademark VITON sold by the Edwards Company.

The axial distance of contact between the diaphragm 15 and the envelope 11 and the capillary 13 depends on the angle of the non-engaging portions of the surfaces, the pressure of the gas in the envelope, and the voltage drop between the chambers 17 and 19. The greater the angle between the non-engaging portions of the adjacent surfaces (i.e., the outer wall 21 and the envelope 11 or the inner wall 23 and the capillary 13), the less the resistance offered by the gap therebetween and hence the greater the required contact distance to prevent breakdown. A greater contact distance is also needed with higher gas pressure, since the gas is more easily ionized. Finally, of course, a higher potential difference requires a greater contact distance. The total axial length of the diaphragm is preferably about one and one quarter time the inner diameter of the envelope.

In some cases, particularly where the capillary is of substantial length, the diaphragm 15 may be insufficient to provide the proper support for the capillary. In such a case, the spring support 53 is provided, the latter being illustrated more fully in FIG. 6. The outer part of the spring support 53 bears against the inner surface of the envelope 11 and the inner part is formed with a pair of detents 55 for capturing the capillary 13.

In assembling the illustrated laser, the diaphragm 15 is first placed on the capillary 13 and the inner spring 51 is put in place in the groove 47. The assembly is then inserted into the open-ended envelope 11 to the proper location and the outer spring 49 is put in place in the groove 45. The support spring 53 is then put in place as are the electrodes 31 and 33 and their foil strip connections 35 and 37. The mirrors 27 and 29 are then cemented on with an epoxy. The tube is then evacuated by means of a suitable pumping system, preferably with a 0.001 milligrams per second or less contamination rate. The tube chambers 17 and 19 are then filled with helium and neon to the proper pressure, depending upon the optical geometry and resonator design, as is known in the art. Although not absolutely necessary, a getter is preferably included. A getter is a chemically active material that captures contaminants and prevents the contaminants from poisoning the gas in the tube. This getter can be introduced to the inside of the tube by means of a movable anode, no shown, through the evacuation ports. Once the tube is filled with appropriate gases at the appropriate pressure, the evacuation ports 39 and 41 are then suitably sealed.

It is also preferable that the cathode and perhaps the anode be prepared by one or several of the following steps:

a. Heating in vacuum by RF induction heating;
b. Heating in helium, helium-neon, neon or oxygen by RF induction heating;
c. Heating in helium, helium-neon, neon or oxygen by DC discharge; and
d. Heating in helium, helium-neon, neon oxygen or vacuum by means of an external heater. Item c. above requires either an additional electrode in the tube or a movable electrode situated in the evacuation port. The movable electrode may be advanced for operation and retracted when the tube is sealed off.

In the case of the mirrors 27 and 29 it is necessary that the mirrors be properly aligned, as is known in the art, when mounted on the envelope. If external mirrors are used, alignment of the blanks or transparent ends 27 and 29 is according to the chosen angle.

It may therefore be seen that the invention provides an improved laser of the coaxial type in which the amount of glass blowing required is significantly reduced. Moreover, the laser is readily assembled in a manner such that a semiskilled worker or even an automated system may be utilized. No complex glass joints are required and the envelope is therefore stronger. For the same reason, minimal internal stresses result from the disclosed construction. Finally, the various dimensions of the portions of the laser are easily regulated.

Various modifications of the invention in addition to those shown and described herein will become apparent to those skilled in the art from the foregoing description and accompanying drawings. Such modifications are intended to to fall within the scope of the appended claims.

What is claimed is:

1. A laser comprising, a glass envelope, an elongated capillary disposed axially within said envelope, and a diaphragm of flexible electrically non-conductive material at least partially supporting said capillary and dividing the interior of said glass envelope into positive and negative discharge chambers, said diaphragm comprising an annular channel member having outer and inner annular walls separated by at least one flexible annular transverse wall to define at least one annular channel, said inner annular wall engaging said capillary and said outer annular wall engaging the inner surface of said envelope along a length of said capillary and said envelope sufficient to prevent discharge between said positive and negative discharge chambers other than through said capillary.

2. A laser according to claim 1 wherein said diaphragm is comprised of a material having an outgassing rate of less than about $5 \times 10^{-8}$ Torr liters per second per square centimeter after 48 hours under vacuum at room temperature.

3. A laser according to claim 1 including means for resiliently biasing said outer annular wall of said diaphragm outwardly against said envelope, and including means for resiliently biasing said inner annular wall of said diaphragm inwardly against said capillary.

4. A laser according to claim 1 wherein said channel member is of generally U-shaped cross section defining a single channel having an open side.

5. A laser according to claim 4 wherein said diaphragm is provided with annular grooves on the channel side of said inner and outer walls adjacent the open side of said channel, and a pair of annular springs mating in said grooves, respectively, to bias said outer annular wall against said envelope and said inner annular wall against said capillary.

6. A laser according to claim 1 including means displaced along said capillary from said diaphragm for providing additional support for said capillary within said envelope.

7. A laser comprising an elongated tubular glass envelope having a pair of evacuation ports spaced axially therealong, a pair of electrodes spaced axially within said envelope, an elongated glass capillary disposed within said envelope lying along the axis of said tubular envelope, a diaphragm of flexible electrically non-conductive material partially supporting said capillary and positioned between said pair of evacuation ports and between said pair of electrodes, dividing the interior of said glass envelope into positive and negative discharge chambers, said diaphragm comprising an annulus of generally U-shaped cross section to define outer and inner annular walls separated by an annular channel, said inner annular wall engaging said capillary and said outer annular wall engaging the inner surface of said envelope along a length of said capillary and said envelope sufficient to prevent discharge between said chambers other than through said capillary, and a support member positioned along said capillary displaced from said diaphragm for partially supporting said capillary.

8. For use in a laser having a capillary coaxially positioned within a tubular envelope, a diaphragm for maintaining separation between positive and negative discharge chambers in the envelope, said diaphragm being comprised of flexible electrically non-conductive material formed in an annulus of generally U-shaped cross section to define inner and outer annular walls separated by an annular channel, at least part of said inner annular wall being of a diameter to engage the capillary and at least part of said outer annular wall being of a diameter to engage the envelope, said parts of said outer and inner annular walls being of an axial length sufficient to prevent discharge between the positive and negative discharge chambers of the laser other than through the capillary.

9. A diaphragm according to claim 8 wherein said outer annular wall is of increasing diameter toward the open side of said annular channel, and wherein said inner annular wall is of decreasing diameter toward the open side of said annular channel.

* * * * *